United States Patent [19]

Yoshida et al.

[11] Patent Number: 4,985,880
[45] Date of Patent: Jan. 15, 1991

[54] OPTICAL INFORMATION RECORDING AND REPRODUCING APPARATUS

[75] Inventors: Yoshio Yoshida; Nobuo Ogata, both of Tenri; Mitsuo Ishii, Yamatokoriyama; Yukio Kurata, Tenri; Yasuo Nakata, Tenri; Takayuki Inoue, Nara; Kazuko Inoue, Nara, all of Japan

[73] Assignee: Sharp Kabushiki Kaisha, Osaka, Japan

[21] Appl. No.: 247,355

[22] Filed: Sep. 21, 1988

[30] Foreign Application Priority Data

Sep. 21, 1987 [JP]  Japan .................. 62-236756

[51] Int. Cl.⁵ .................. G11B 13/04; G11B 11/10; G11B 11/12
[52] U.S. Cl. .................. 369/13; 369/54; 369/110
[58] Field of Search .................. 369/13, 54, 58, 110; 360/114, 59; 365/122

[56] References Cited

U.S. PATENT DOCUMENTS

| | | | |
|---|---|---|---|
| 3,731,290 | 5/1973 | Aagard | 360/114 |
| 4,599,714 | 7/1986 | Endo | 360/114 |
| 4,689,779 | 8/1987 | Hayashi et al. | 369/58 |

Primary Examiner—Stuart S. Levy
Assistant Examiner—Hoa Nguyen

[57]    ABSTRACT

An improved optical information recording and reproducing apparatus which is capable of detecting recording errors simultaneously with recording function for reduction of recording time, without requiring particular high accuracy for an optical system, and avoiding complication in the construction and consequent large size of the optical system.

7 Claims, 3 Drawing Sheets

OPTICAL INFORMATION RECORDING AND REPRODUCING APPARATUS

BACKGROUND OF THE INVENTION

The present invention generally relates to a recording and reproducing arrangement, and more particularly, to an optical information recording and reproducing apparatus such as a magneto-optical disc apparatus or the like for recording and reproducing signals with respect to a magneto-optical recording medium through utilization of magneto-optical effect.

Conventional optical information recording and reproducing apparatus of the type referred to above, are shown in FIG. 3, so that light emitted from a semi-conductor laser source 21 is incident upon a beam splitter 24 through a collimating lens 22 and a shaping prism 23, with nearly linearly polarized light perpendicular to an optical axis and parallel to the paper surface, being transmitted through the beam splitter 24. Light transmitted through the beam splitter 24 is incident upon an objective lens 26 through a mirror 25, and projected onto a disc 27 for the magneto-optical recording medium as a focused spot by said objective lens 26 so as to effect the recording function. During the reproducing function, light projected onto the disc 27 is subjected to the magneto-optical effect and proceeds through the objective lens 26 and the mirror 25 towards the beam splitter 24 in the form of reflected light so as to be reflected by said beam splitter 24. The reflected light is incident upon a polarizing beam splitter 29 through a ½ wavelength plate 28 and divided in two directions incident upon photo-detectors 30 and 31. The light rays thus incident upon the photo-detectors 30 and 31 and corresponding to the magnetizing direction of the disc 27 shown in FIG. 4(a). The light rays are converted into information signals $S_1$ and $S_2$ (electrical signals) as shown in FIGS. 4(b), and 4(c) so as to be applied to a differential amplifier 32. Thus, the signals are taken out as an information signal $S_D$ amplified two times, with the noise component of the same phase being cancelled as shown in FIG. 4(d), and the reproduction of the recorded information is to be effected by reproducing the information signal $S_D$.

For detecting any recording error during the recording function in the conventional optical information recording and reproducing apparatus as described above, there have been known a practice for detection by effecting the reproducing function as referred to above, and another practice for detection which employs two light fluxes, one for recording and the other for reproduction following the light flux for the recording.

However, in the former practice as described above, the time for detecting the erroneous recording is approximately equal to that for recording. More specifically and for example, where the magneto-optical recording medium is in the form of a disc, the time required for the detection of the recording errors is equivalent to one rotation of the disc, thereby extremely obstructing recording at higher speeds in a shorter period of time.

In contrast, the latter practice requires a highly accurate optical system since the two light fluxes are adapted to be focused on the magneto-optical recording medium. Moreover, different driving circuits are respectively necessary for driving the two light sources, thus inviting such problems as complication in construction and consequent large size of the apparatus.

SUMMARY OF THE INVENTION

Accordingly, an essential object of the present invention is to provide an improved optical information recording and reproducing apparatus capable of detecting the recording errors simultaneously with recording function for reducing recording time without requiring particular high accuracy for an optical system and avoiding complicated construction and consequent large size optical system.

Another object of the present invention is to provide an optical information recording and reproducing apparatus of the above described type with stable functioning and high reliability that can be readily manufactured at low cost.

In accomplishing these and other objects, according to one preferred embodiment of the present invention, there is provided an optical information recording and reproducing apparatus which includes a light emitting element, a focusing element for collecting light emitted from the light emitting element onto a magneto-optical recording medium. By raising the temperature at the recording portion of the magneto-optical recording medium above Curie temperature the recording portion is magnetized in a direction of external magnetic field to effect the recording of information. The apparatus further includes an analyzing element for separating the light reflected from the magneto-optical recording medium into two polarization components in two directions corresponding to magnetizing direction in the magneto-optical recording medium and corresponding photo-detecting element for converting the separated light into electrical signals so as to obtain reproduction signal from the information signal thus obtained. The optical information recording and reproducing apparatus further includes a subtracting element for subtracting the information signal obtained by the respective photo-detecting element during the recording function, a waveform shaping element for adjusting the waveform of output signal from the subtracting element, and a comparing element for comparing the output signal of said waveform shaping means with a preliminarily set threshold value.

By the above arrangement, during the recording function, the light emitted from the light emitting element is focused onto the magneto-optical recording medium by the focusing element, and the temperature at the recording portion of this magneto-optical recording medium is raised above Curie temperature. The recording portion raised above the Curie temperature loses its magnetized state, and is then magnetized in the direction of the external magnetic field to effect recording of the information. Meanwhile, the reflected light from the magneto-optical recording medium is separated into light signals in two directions in correspondence to the magnetizing direction in the magneto-optical recording medium by the analyzing element, and the light thus separated is converted into electrical signals by the corresponding photo-detecting element. The information signal obtained from each photo-detecting means is subtracted by the subtracting element, and thereafter, adjusted for the waveform by the waveform shaping element, and is subsequently, compared with the preliminarily set threshold value by the comparing element. Thus, by observing the value of the output signal of the waveform shaping element with respect to the threshold value, presence of errors in the recording is judged.

More specifically, since the recording portion of the magneto-optical recording medium has lost its magnetized state during recording as described above, the reflected light from the recording portion is not subjected to the magneto-optical effect. Accordingly, the output signals from the above two photo-detecting means come to be in the same level in the absolute value, and the outputs of the subtracting element and the waveform shaping element become zero. On the other hand, since the recorded portion of the magneto-optical recording medium is in the magnetized state, the reflected light from said portion is subjected to the magneto-optical effect, and the output subtracting element shows a predetermined value, whereby through comparison of the output of the waveform shaping element with the threshold value by the comparing element, it may be judged whether or not the recording is correctly effected. Since the above judging function is effected simultaneously with the recording function, the recording function can be effected at higher speeds.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
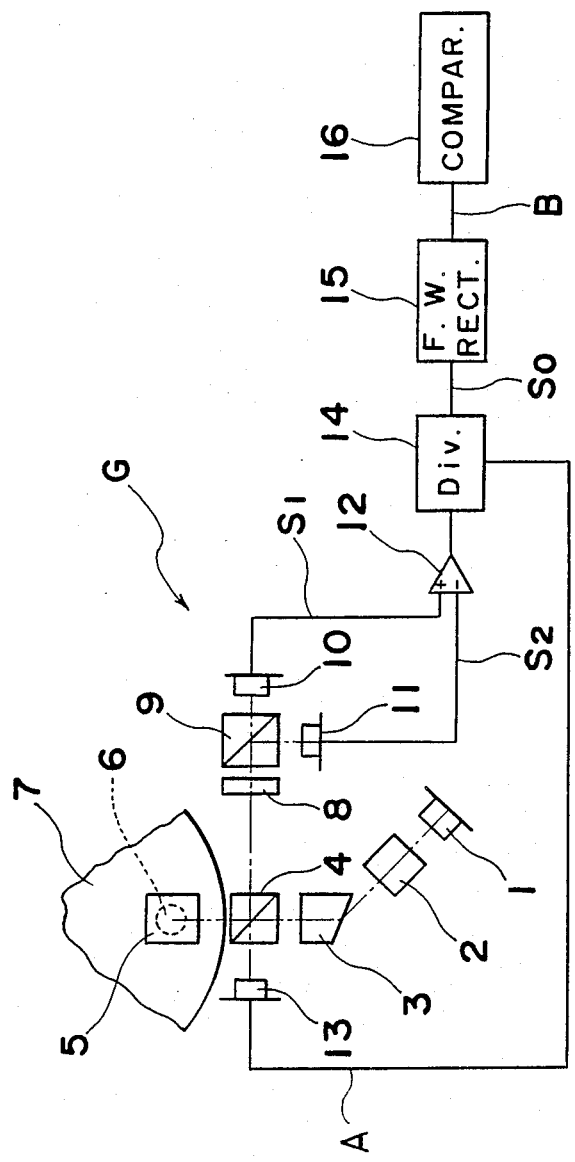
FIG. 1 is a schematic diagram showing general construction of an optical information recording and reproducing apparatus according to one preferred embodiment of the present invention.

In the description of the present invention below, like parts are designated by like reference numerals throughout the accompanying drawings.

Referring now to the drawings, there is shown in FIG. 1, an optical information recording and reproducing apparatus G according to one preferred embodiment of the present invention. The apparatus generally includes a semi-conductor laser source 1 as a light emitting element for emitting laser light, a collimating lens 2 for converting the light emitted from the semi-conductor laser source 1 into parallel light, a shaping prism 3 for converting the parallel light as obtained by the collimating lens 2 into a light flux which may be regarded as in Gaussion distribution and a beam splitter 4 for transmitting P wave (P wave represents polarized light parallel to the paper surface; S wave represents polarized light perpendicular to the optical axis in the light flux as obtained by said shaping prism 3), and also for reflecting the reflection light from the disc 7 for a magneto-optical recording medium, obtained through an objective lens 6 as a focusing element and a mirror 5 so as to change the advancing direction of said reflection light. The mirror 5 the transmitted light from the beam splitter 4 towards the disc 7 therebelow. The objective lens 6 collects light forwarded from the mirror 5 for projection onto the recording portion of the disc 7 as a focused spot.

Figure 2:
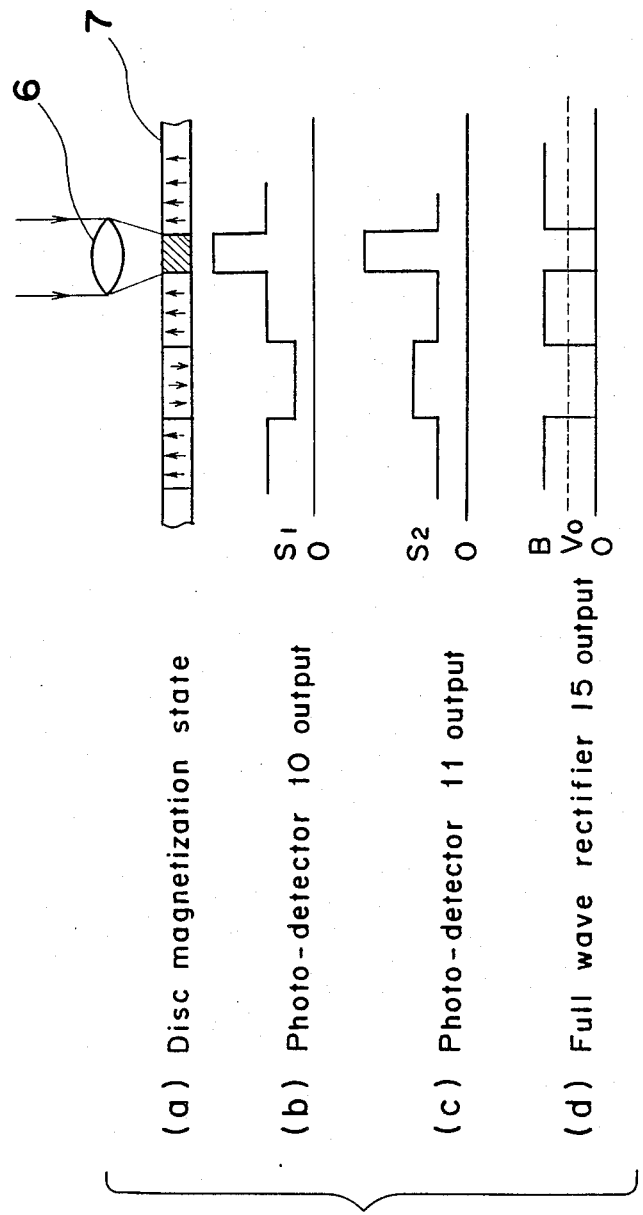
FIG. 2(a) is a diagram for explaining the state of magnetization of a disc employed in FIG. 1.
FIGS. 2(b), 2(c) and 2(d) are timing charts showing output signals of photo-detectors and a full wave rectifier corresponding to FIG. 2(a)
Figure 3:
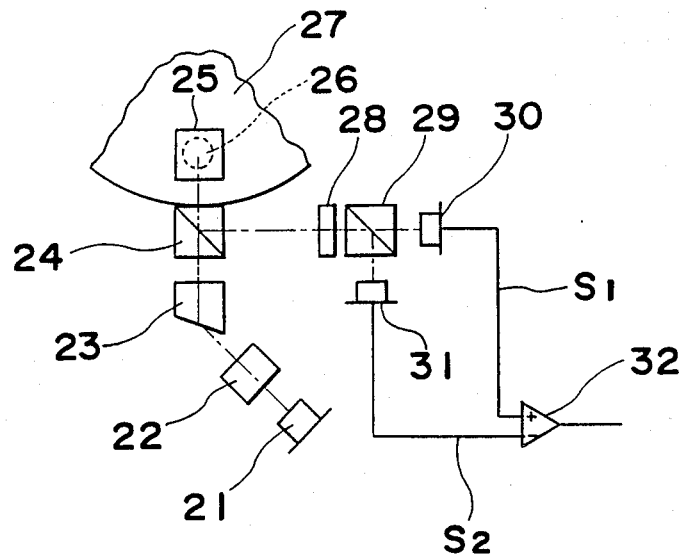
FIG. 3 is a schematic diagram showing general construction of a conventional optical information recording and reproducing apparatus.
Figure 4:
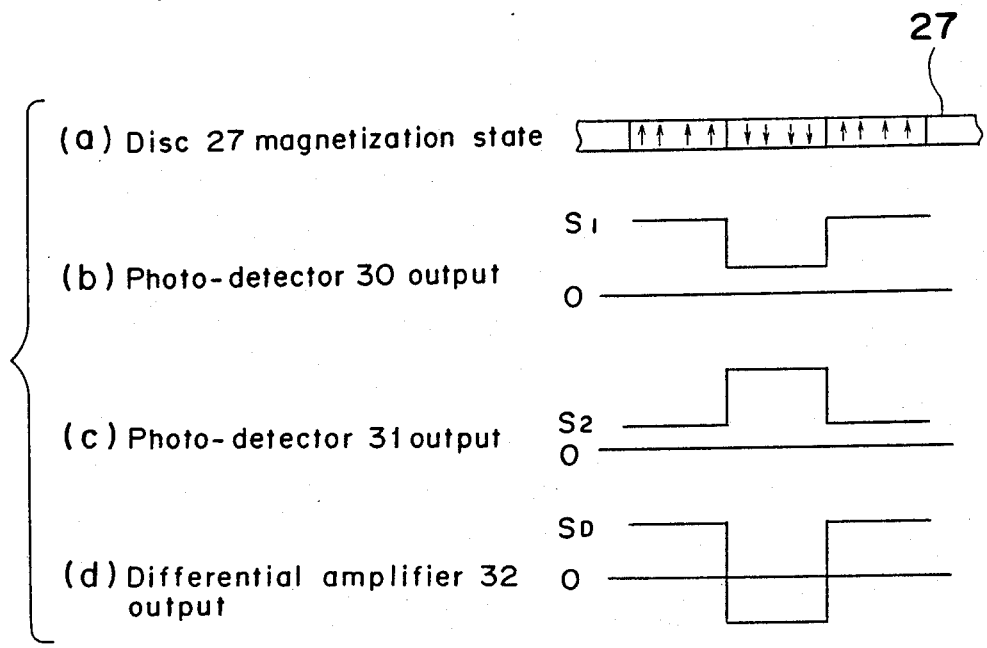
FIG. 4(a) is a diagram for explaining the state of magnetization of a disc employed in FIG. 3.
FIGS. 4(b), 4(c) and 4(d) are timing charts showing output signals of photo-detectors and a full wave rectifier corresponding to FIG. 4(a).

The optical information recording and reproducing apparatus G further includes a ½ wavelength plate 8 provided in an optical path of the reflection light from the disc 7. The reflection light proceeds toward through the objective lens 6 and encounters the mirror 5. The beam splitter's 4 crystal axis is inclined at 22.5° with respect to the direction of the P wave and disposed perpendicular to the optical axis. A polarizing beam splitter 9 serves as an analyzing element for taking out the light obtained through said ½ wavelength plate 8 as divided into the P wave component and the S wave component. Photo-detectors 10 and 11, as a photo-detecting elements, convert the light divided by the polarizing beam splitter 9 into electrical signals. A differential amplifier 12 serves as a subtracting element for receiving output signals from the photo-detectors 10 and 11 to take out the difference between the both signals. Another photo-detector 13 detects the amount of the reflection light incident upon the beam splitter 4 from the shaping prism 3. A divider 14 divides the output of said differential amplifier 12 by the output of said photo-detector 13. A full wave rectifier 15 serves as a waveform shaping element for subjecting the output of said divider 14 to full wave rectification. A comparator 16 compares the output of said full wave rectifier 15 with a preliminarily set threshold value. All of the elements are coupled with each other as shown in FIG. 2.

In the above arrangement, which recording information, light emitted from the semi-conductor laser source 1 is corrected into the parallel light by the collimating lens 2, and is further converted by the shaping prism 3 into the light flux regarded to be of Gaussian distribution in the light intensity distribution. The light flux emitted from the shaping prism 3 is incident upon the beam splitter 4, and in the P wave perpendicular to the optical axis and parallel to the paper surface and the S wave which is the polarized light perpendicular to the paper surface, much more of the P wave is transmitted through the beam splitter 4. After being altered in its advancing direction downwards by the mirror 5, the light transmitted through the beam splitter 4 is collected by the objective lens 6 for projection onto the recording medium portion of the disc 7 as the focused spot.

At the recording medium portion of the disc 7, the magnetization easy axis is directed perpendicular to the film surface of the recording medium portion, with said portion being magnetized preliminarily in a predetermined direction. Thus, by receiving the light energy of the focused light spot, the temperature of the recording medium portion is raised above Curie temperature, and the state of magnetization at said portion disappears. Then, when the state of light irradiation is released as the focused light spot is shifted, the portion at which the state of magnetization has disappeared is magnetized in the direction opposite to that in the initial magnetization by the external magnetic field, and thus, recording of information is effected.

Subsequently, the light projected onto the disc 7 proceeds to the objective lens 6, the mirror 5, and the beam splitter 4, and is reflected by said beam splitter 4. The above reflected light is incident upon the polarizing beam splitter 9 through the ½ wavelength plate 8 so as to be taken out as it is divided into the P wave component and the S wave component. These divided light fluxes are respectively incident upon the photo-detectors 10 and 11 for conversion into electrical signals, and are taken out as signals in opposite phases e.g. a signals $S_1$ shown in FIG. 2(b) and a signal $S_2$ shown in FIG. 2(c), according to the direction of magnetization on the disc 7 as illustrated in FIG. 2(a). These signals $S_1$ and $S_2$ are outputted as signals amplified two times as they are inputted to the differential amplifier 12, and applied to the divider 14.

On the other hand, during the recording function, part of the light emitted by the semi-conductor laser source 1 is reflected by the beam splitter 4 so as to be incident upon the photo-detector 13. The light incident upon the photo-detector 13 is converted into an electrical signal, and supplied to the divider 14 as a light intensity signal A proportionate to the intensity of light from the semi-conductor laser source 1. Thus, by using this light intensity signal A as a denominator input, division of the above signals $S_1$ and $S_2$ is effected. The output signal $S_0$ of the divider 14 is adjusted to the waveform of a full wave rectification by the full wave rectifier 15 and is taken out as a signal B to be judged as shown in FIG. 2(d). This signal B to be judged is compared with the preliminarily set threshold value $V_0$ similarly shown in FIG. 2(d) by the comparator 16 to check whether or not the recording function has been positively effected, with the recording bit at the disc 7 having reached Curie temperature.

More specifically, at timing to effect inversion of magnetization when the recording is to be effected, the focused light spot having comparatively large energy is projected onto the recording medium portion of the disc 7, with the state of magnetization at the recording medium portion having disappeared. Therefore, at the point in time when the focused light spot is projected, no magneto-optical effect takes place. Accordingly, the signals $S_1$ and $S_2$ come to be in the same level in their absolute values, and the output signal of the differential amplifier 12, the output signal $S_0$ of the divider 14 and the signal B to be judged of the output of the full wave rectifier 15 become zero respectively. Once the portion of the recording medium of the disc 7 for receiving the information magnetized, the output signal of the differential amplifier 12, the output signal $S_0$ of the divider 14, and the signal B to be judged, for the output of the full wave rectifier 15 as obtained from the reflection light at said portion, show predetermined values. Therefore, by comparing the signal B to be judged with the threshold value $V_0$ at the comparator 16, it is possible to judge whether or not the recording is normally effected. In FIG. 2(d), the portion lower than the threshold value $V_0$ is the portion recorded.

On the other hand, at timing not to effect inversion of magnetization when recording is to be effected, light set to such an intensity as will not produce the magnetization inversion at the recording medium portion on the disc 7, i.e. as will not cause the recording medium portion to reach Curie temperature, is emitted from the semi-conductor laser source 1. This light is projected onto the recording medium portion of the disc 7, and is reflected in the form of light inclined in the azimuth angle by the magneto-optical effect, and is incident upon the differential amplifier 12 through the similar passage as above so as to be taken out from the differential amplifier 12 as the information signal for the reproduction.

It should be noted here that, in the foregoing embodiment, although the output signal of the photo-detector 13 is used for the denominator input of the divider 14, in the case where the semi-conductor laser source 1 is made, for example, by a laser diode, the output signal of a photo-diode for output monitoring, incorporated in the laser diode may be utilized for the purpose. Similarly, it may be so modified to use the sum signal of the output signals $S_1$ and $S_2$ of the photo-detectors 10 and 11, or to omit the divider 14.

As is clear from the foregoing description, the optical information recording and reproducing apparatus according to the present invention includes the light emitting means, the focusing means for collecting light emitted from said light emitting means onto the magneto-optical recording medium for raising temperature at the recording portion of said magneto-optical recording medium above Curie temperature so as to magnetize the recording portion in the direction of external magnetic field, thereby to effect recording of information, the analyzing means for separating the light reflected from the magneto-optical recording medium into polarization components in two directions corresponding to magnetizing direction in the magneto-optical recording medium, and corresponding photo-detecting means for converting the separated light components into electrical signals so as to obtain reproduction signal from the information signal thus obtained. The optical information recording and reproducing apparatus is characterized in that there are further provided the subtracting means for subtracting the information signal obtained by the respective photo-detecting means during recording function, the waveform shaping means for adjusting the waveform of output signal from said subtracting means, and the comparing means for comparing the output signal of said waveform shaping means with the preliminarily set threshold value.

Therefore, recording errors may be detected simultaneously with the recording function, without inviting complication in the construction and size increase of the optical system, and also, without requiring particular high accuracy in the optical system, and thus, reduction of recording time can be advantageously achieved.

Although the present invention has been fully described by way of example with reference to the accompanying drawings, it is to be noted here that various changes and modifications will be apparent to those skilled in the art. Therefore, unless otherwise such changes and modifications depart form the scope of the present invention, they should be construed as included therein.

What is claimed is:

1. An optical information recording and reproducing apparatus comprising:
   a light emitting means for emitting an information bearing light signal;
   a focusing means for collecting said light emitted from said light emitting means onto a magneto-optical recording medium by raising the temperature at a selected portion of said magneto-optical recording medium above Curie temperature to magnetize that portion of said recording medium for recording information;
   analyzing means for separating the light reflected from the magneto-optical recording medium into polarized components in two directions corresponding to the magnetizing direction in the magnetized portion of said magneto-optical recording medium;

first and second photo-detecting means for converting said polarized light components into electrical signals for obtaining reproduction signals from the information recorded on said magneto-optical medium;

third photo-detector means for converting light received from said light emitting means before reflected by said recording medium into an electrical signal;

said optical information recording and reproducing apparatus further comprising subtracting means for producing an electrical signal by subtracting the information signal obtained by each respective first and second photo-detecting means during the recording function, and by dividing the difference by the value of the signal produced by said third photo-detector means;

waveform shaping means for adjusting the waveform of an output signal from said subtracting means; and a comparing means for comparing the output signal of said waveform shaping means with a preliminary set of threshold values to identify recording errors.

2. An optical information recording and reproducing apparatus as claimed in claim 1, wherein said light emitting means comprises a semi-conductor laser source.

3. An optical information recording and reproducing apparatus as claimed in claim 1, wherein said focusing means comprises an objective lens.

4. An optical information recording and reproducing apparatus as claimed in claim 1, wherein said analyzing means comprises a polarizing beam splitter.

5. An optical information recording and reproducing apparatus as claimed in claim 1, wherein said first and second photo-detecting means comprises two photo-detectors for monitoring P waves and S waves, respectively.

6. An optical information recording and reproducing apparatus as claimed in claim 1, wherein said subtracting means comprises a differential amplifier.

7. An optical information recording and reproducing apparatus as claimed in claim 1, wherein said waveform shaping means comprises a full wave rectifier.

* * * * *